US009996579B2

(12) United States Patent
Dorner et al.

(10) Patent No.: US 9,996,579 B2
(45) Date of Patent: Jun. 12, 2018

(54) FAST COLOR SEARCHING

(71) Applicant: Amazon Technologies, Inc., Seattle, WA (US)

(72) Inventors: Charles Shearer Dorner, Seattle, WA (US); Paul Barnhart Sayre, III, Gig Harbor, WA (US)

(73) Assignee: Amazon Technologies, Inc., Seattle, WA (US)

( * ) Notice: Subject to any disclaimer, the term of this patent is extended or adjusted under 35 U.S.C. 154(b) by 431 days.

(21) Appl. No.: 14/315,700

(22) Filed: Jun. 26, 2014

(65) Prior Publication Data

US 2015/0379071 A1    Dec. 31, 2015

(51) Int. Cl.
G06F 7/00      (2006.01)
G09F 17/00     (2006.01)
G06F 17/30     (2006.01)

(52) U.S. Cl.
CPC .... G06F 17/30424 (2013.01); G06F 17/3025 (2013.01); G06F 17/3028 (2013.01); G06F 17/30321 (2013.01); G06F 17/30333 (2013.01)

(58) Field of Classification Search
None
See application file for complete search history.

(56) References Cited

U.S. PATENT DOCUMENTS

| | | |
|---|---|---|
| 5,508,718 A | 4/1996 | Haikin |
| 5,544,284 A | 8/1996 | Allebach et al. |
| 5,684,895 A * | 11/1997 | Harrington ............... G06T 9/00 345/545 |
| 5,822,503 A | 10/1998 | Gass, Jr. et al. |
| 6,014,125 A | 1/2000 | Herbert |
| 6,081,276 A | 6/2000 | Delp |
| 6,124,945 A | 9/2000 | Ishihara et al. |
| 6,385,336 B1 | 5/2002 | Jin |
| 6,513,014 B1 | 1/2003 | Walker et al. |

(Continued)

FOREIGN PATENT DOCUMENTS

| | | |
|---|---|---|
| CN | 107077474 A | 8/2017 |
| CN | 107077698 A | 8/2017 |

(Continued)

OTHER PUBLICATIONS

Manjunath, B.S.;Color and Texture Descriptors; 2001;IEEE; vol. 11 No. 6; pp. 703-714.*

(Continued)

*Primary Examiner* — Mariela Reyes
*Assistant Examiner* — Jermaine Mincey
(74) *Attorney, Agent, or Firm* — Knobbe Martens Olson & Bear LLP

(57) ABSTRACT

Systems and methods are described to quickly search a data store based on one or more n-dimensional colors. The n-dimensional colors in the data store may be converted to interleaved integers and indexed. An n-dimensional color search range may be converted to one or more integer search ranges. A fast color search query may be formulated based on the one or more integer search ranges, and transmitted to the data store for searching. The data store may use the interleaved integer index to quickly compare the integer search ranges to the interleaved integers, and send back one or more colors or object results that matched the desired color range.

21 Claims, 6 Drawing Sheets

(56) References Cited

U.S. PATENT DOCUMENTS

| | | |
|---|---|---|
| 6,577,759 B1 | 6/2003 | Caron et al. |
| 7,136,074 B2 | 11/2006 | Hussie |
| 7,444,658 B1 | 10/2008 | Matz et al. |
| 7,801,893 B2 | 9/2010 | Gulli' et al. |
| 7,961,938 B1 | 6/2011 | Remedios |
| 8,393,002 B1 | 3/2013 | Kamvar et al. |
| 8,416,255 B1 | 4/2013 | Gilra |
| 8,553,045 B2 | 10/2013 | Skaff et al. |
| 8,576,241 B1 | 11/2013 | Kanter et al. |
| 8,587,604 B1 | 11/2013 | Kanter et al. |
| 8,593,680 B2 | 11/2013 | Woolfe et al. |
| 8,634,640 B2 | 1/2014 | Bhatti et al. |
| 8,762,419 B2 | 6/2014 | Moroney |
| 8,867,798 B2 | 10/2014 | Shuster |
| 9,047,804 B1 | 6/2015 | Moroney et al. |
| 9,135,719 B1 | 9/2015 | Dorner et al. |
| 9,177,391 B1 | 11/2015 | Dorner et al. |
| 9,245,350 B1 | 1/2016 | Dorner et al. |
| 9,311,889 B1 | 4/2016 | Dorner et al. |
| 9,396,560 B2 | 7/2016 | Dorner et al. |
| 9,401,032 B1 | 7/2016 | Dorner et al. |
| 9,514,543 B2 | 12/2016 | Dorner et al. |
| 9,524,563 B2 | 12/2016 | Sayre et al. |
| 9,542,704 B2 | 1/2017 | Dorner et al. |
| 9,552,656 B2 | 1/2017 | Dorner et al. |
| 9,633,448 B1 | 4/2017 | Dorner |
| 9,652,868 B2 | 5/2017 | Gunningham et al. |
| 9,659,032 B1 | 5/2017 | Dorner et al. |
| 9,679,532 B2 | 6/2017 | Dorner et al. |
| 9,697,573 B1 | 7/2017 | Haitani et al. |
| 9,727,983 B2 | 8/2017 | Dorner et al. |
| 9,741,137 B2 | 8/2017 | Dorner et al. |
| 9,785,649 B1 | 10/2017 | Dorner et al. |
| 9,792,303 B2 | 10/2017 | Sayre, III et al. |
| 2001/0028464 A1 | 10/2001 | Aritomi |
| 2002/0080153 A1 | 6/2002 | Zhao et al. |
| 2003/0004938 A1 | 1/2003 | Lawder |
| 2003/0011612 A1 | 1/2003 | Luo et al. |
| 2003/0083850 A1* | 5/2003 | Schmidt ............... G06T 7/001 702/189 |
| 2003/0142124 A1 | 7/2003 | Takata et al. |
| 2003/0146925 A1 | 8/2003 | Zhao et al. |
| 2004/0090453 A1 | 5/2004 | Jasinschi et al. |
| 2005/0122427 A1 | 6/2005 | Hougui et al. |
| 2005/0149411 A1 | 7/2005 | Colwell |
| 2005/0222978 A1 | 10/2005 | Drory et al. |
| 2006/0023082 A1 | 2/2006 | Higuchi |
| 2006/0066629 A1 | 3/2006 | Norlander et al. |
| 2006/0248081 A1 | 11/2006 | Lamy |
| 2006/0250669 A1 | 11/2006 | Beretta |
| 2006/0268120 A1 | 11/2006 | Funakura et al. |
| 2007/0100786 A1 | 5/2007 | Moroney |
| 2008/0003547 A1 | 1/2008 | Woolfe et al. |
| 2008/0025629 A1 | 1/2008 | Obrador et al. |
| 2008/0025647 A1 | 1/2008 | Obrador et al. |
| 2008/0046410 A1 | 2/2008 | Lieb |
| 2008/0046424 A1 | 2/2008 | Horton |
| 2008/0069442 A1 | 3/2008 | Itoh |
| 2008/0294600 A1 | 11/2008 | Clark et al. |
| 2008/0301582 A1 | 12/2008 | Gluck |
| 2008/0317336 A1 | 12/2008 | Mojsilovic |
| 2009/0027414 A1 | 1/2009 | Vaughn |
| 2009/0041345 A1 | 2/2009 | Tirumalareddy et al. |
| 2009/0055758 A1 | 2/2009 | Sim et al. |
| 2009/0157595 A1 | 6/2009 | Gubitz |
| 2009/0227375 A1 | 9/2009 | Weisman et al. |
| 2009/0248626 A1 | 10/2009 | Miller |
| 2009/0259567 A1 | 10/2009 | Watts |
| 2009/0281925 A1 | 11/2009 | Winter et al. |
| 2010/0027834 A1 | 2/2010 | Spitzig et al. |
| 2010/0053201 A1 | 3/2010 | Klassen et al. |
| 2010/0082654 A1 | 4/2010 | Zhang et al. |
| 2010/0110455 A1 | 5/2010 | Woolfe |
| 2010/0158412 A1 | 6/2010 | Wang et al. |
| 2011/0029510 A1 | 2/2011 | Kroon et al. |
| 2011/0135195 A1 | 6/2011 | Marchesotti et al. |
| 2011/0205231 A1 | 8/2011 | Hartley et al. |
| 2011/0305386 A1 | 12/2011 | Wang et al. |
| 2011/0319160 A1 | 12/2011 | Arn et al. |
| 2012/0036163 A1 | 2/2012 | Myers et al. |
| 2012/0045121 A1 | 2/2012 | Youngman et al. |
| 2012/0075329 A1 | 3/2012 | Skaff et al. |
| 2012/0099784 A1 | 4/2012 | Marchesotti et al. |
| 2012/0099788 A1 | 4/2012 | Bhatti et al. |
| 2012/0109944 A1 | 5/2012 | Hao |
| 2012/0154420 A1 | 6/2012 | Calandrino et al. |
| 2012/0163710 A1 | 6/2012 | Skaff et al. |
| 2012/0206477 A1 | 8/2012 | Yanagisawa |
| 2013/0013991 A1 | 1/2013 | Evans |
| 2013/0033603 A1 | 2/2013 | Suzuki et al. |
| 2013/0050238 A1 | 2/2013 | Bergou et al. |
| 2013/0148741 A1 | 6/2013 | Steinberg et al. |
| 2013/0226659 A1 | 8/2013 | Patel et al. |
| 2013/0227636 A1 | 8/2013 | Bettini et al. |
| 2013/0235398 A1 | 9/2013 | Bhatti et al. |
| 2013/0266217 A1 | 10/2013 | Gershon et al. |
| 2013/0300761 A1 | 11/2013 | Ahmed |
| 2014/0037200 A1 | 2/2014 | Phillips et al. |
| 2014/0044349 A1 | 2/2014 | Wang et al. |
| 2014/0049799 A1 | 2/2014 | Li et al. |
| 2014/0052584 A1 | 2/2014 | Gershon et al. |
| 2014/0067014 A1 | 3/2014 | Kaula et al. |
| 2014/0089781 A1 | 3/2014 | Hoguet |
| 2014/0153821 A1 | 6/2014 | Masuko et al. |
| 2014/0177952 A1 | 6/2014 | Masuko |
| 2014/0189476 A1 | 7/2014 | Berthelot et al. |
| 2014/0270498 A1 | 9/2014 | Chester et al. |
| 2014/0300775 A1 | 10/2014 | Fan et al. |
| 2014/0304661 A1 | 10/2014 | Topakas et al. |
| 2014/0334722 A1 | 11/2014 | Bloore et al. |
| 2014/0355874 A1 | 12/2014 | Sakamaki et al. |
| 2015/0235110 A1 | 8/2015 | Curtis et al. |
| 2015/0235389 A1 | 8/2015 | Miller et al. |
| 2015/0262549 A1 | 9/2015 | Moroney |
| 2015/0269747 A1 | 9/2015 | Hogan et al. |
| 2015/0324392 A1 | 11/2015 | Becker et al. |
| 2015/0324394 A1 | 11/2015 | Becker et al. |
| 2015/0332479 A1* | 11/2015 | Gershon ............ G06F 17/3025 382/164 |
| 2015/0356128 A1* | 12/2015 | Nishimura ........ G06F 17/30324 707/745 |
| 2015/0378999 A1 | 12/2015 | Dorner et al. |
| 2015/0379000 A1 | 12/2015 | Haitani et al. |
| 2015/0379001 A1 | 12/2015 | Gunningham et al. |
| 2015/0379002 A1 | 12/2015 | Dorner et al. |
| 2015/0379003 A1 | 12/2015 | Dorner et al. |
| 2015/0379004 A1 | 12/2015 | Sayre et al. |
| 2015/0379005 A1 | 12/2015 | Dorner et al. |
| 2015/0379006 A1 | 12/2015 | Dorner et al. |
| 2015/0379608 A1 | 12/2015 | Dorner et al. |
| 2015/0379731 A1 | 12/2015 | Dorner et al. |
| 2015/0379732 A1 | 12/2015 | Sayre et al. |
| 2015/0379733 A1 | 12/2015 | Dorner et al. |
| 2015/0379738 A1 | 12/2015 | Gunningham et al. |
| 2015/0379739 A1 | 12/2015 | Dorner et al. |
| 2015/0379743 A1 | 12/2015 | Dorner et al. |
| 2015/0379959 A1 | 12/2015 | Dorner et al. |
| 2016/0005188 A1 | 1/2016 | Dorner et al. |
| 2016/0005201 A1 | 1/2016 | Kunkel et al. |
| 2016/0104303 A1 | 4/2016 | Dorner et al. |
| 2016/0335784 A1 | 11/2016 | Dorner et al. |
| 2017/0084053 A1 | 3/2017 | Dorner et al. |
| 2017/0098314 A1 | 4/2017 | Sayre et al. |
| 2017/0206061 A1 | 7/2017 | Kumar et al. |
| 2017/0270620 A1 | 9/2017 | Haitani et al. |

FOREIGN PATENT DOCUMENTS

| | | |
|---|---|---|
| EP | 3 161 677 | 5/2017 |
| EP | 3 161 770 | 5/2017 |
| JP | 2007-286767 A | 11/2007 |
| JP | 2009-181468 A | 8/2009 |
| JP | 2009-251850 A | 10/2009 |
| JP | 2011-154687 A | 8/2011 |

(56) References Cited

FOREIGN PATENT DOCUMENTS

| JP | 2012-221317 A | 11/2012 |
|---|---|---|
| WO | WO 2014/070914 A1 | 5/2014 |
| WO | WO 2015/145766 A1 | 10/2015 |
| WO | WO 2015/200502 A1 | 12/2015 |
| WO | WO 2015/200505 A1 | 12/2015 |
| WO | WO 2015/200509 A1 | 12/2015 |
| WO | WO 2015/200515 A1 | 12/2015 |
| WO | WO 2015/200523 A1 | 12/2015 |

OTHER PUBLICATIONS

"Exalead CloudView Semantics Whitepaper," Doc. No. EN.140. 001.0-V1.2; Oct. 2010, pp. 1-30. Retrieved from http:www.3ds.com/fileadmin/Products/Exalead/Documents/whitepapers/Exalead-CloudView-Semantics-EN.pdf on Aug. 24, 2015.

Bell, E., Color Detection: Technology on Heels With Lyst Engineering, dated Feb. 22, 2014, retrieved Apr. 7, 2014, <http://developers.lyst.com/data/images/2014/02/22/color-detection/>.

Beretta, Giordano B., et al.; "Harmonious colors: from alchemy to science," Color Imaging XVII: Displaying Processing, Hardcopy, and Applications, SPIE vol. 8292, No. 1, pp. 1-7; Bellingham, WA; Jan. 22, 2012.

Csurka, Gabriela, et al.; "Learning moods and emotions from color combinations," Proceedings of the Seventh Indian Conference on Computer Vision, Graphics and Image Processing, pp. 298-305; New York; Dec. 12, 2010.

Das et al., "Indexing flowers by color names using domain knowledge-driven segmentation," Proc. The Fourth IEEE Workshop on Applications of Computer Vision; pp. 94-99; 1998.

Dorner, C.S., Image-Based Color Palette Generation, U.S. Appl. No. 14/316,483, filed Jun. 26, 2014.

Dorner, C.S., Automatic Image-Based Recommendations Using a Color Palette, U.S. Appl. No. 14/316,268, filed Jun. 26, 2014.

Global Color Survey, http://www.colorcom.com/global-color-survey, Feb. 1, 2001, accessed Sep. 11, 2015.

Heer, Jeffrey, et al.; "Color naming models for color selection, image editing and palette design," Proceedings of the 2012 ACM Annual Conference on Human Factors in Computing Systems, pp. 1007-1016; New York; May 5, 2012.

Lawder, Jonathan, "The Application of Space-filling Curves to the Storage and Retrieval of Multi-dimensional Data," PhD thesis; Sections 4.3.5.1, p. 68, and 6.5, pp. 121-130; Jan. 1, 2000.

Luo, J., et al., "Novel Color Palettization Scheme for Preserving Important Colors," Proceedings SPIE 5008. Color Imaging VIII: Processing, Hardcopy, and Applications; Jan. 20, 2003.

Montagne, C., et al., "Adaptive Color Quantization Using the Baker's Transformation," J. Electronic Imaging 15(2), Apr.-Jun. 2006, 21 pages.

Periasamy, P.S., et al., "A Common Palette Creation Algorithm for Multiple Images with Transparency Information," Proceedings of the International Conference on Advances in Computing, Control, and Telecommunication Techologies, IEEE 2009.

Tremeau et al., "A vector quantization algorithm based on the nearest neighbor of the furthest color," Proceedings of International Conference on Image Processing, vol. 3, pp. 682-685, Oct. 26-29, 1997.

Tropf, H. et al., "Multidimensional range search in dynamically balanced trees," Angewandte Informatik (Applied Informatics), pp. 71-77; Braunschweig, Germany; Feb. 1, 1981.

Wang et al., "Contextual Dominant Color Name Extraction for Web Image Search," 2012 IEEE International Conference on Multimedia and Expo Workshops (ICMEW), pp. 319-324.

Yu, M.P., et al., "Contextual Algorithm for Color Quantization," J. Electronic Imaging 12(3):442-447, Jul. 2003.

Zhu, Haiping, et al., "Deep into Color Names: Matching Color Descriptions by Their Fuzzy Semantics," Artificial Intelligence: Methodology, Systems, and Applications Lecture Notes in Computer Science; Lecture Notes in Artificial Intelligence, pp. 138-149; Jan. 1, 2006.

International Search Report and Written Opinion in PCT/US2015/037469 dated Oct. 1, 2015.

International Search Report and Written Opinion in PCT/US2015/037456 dated Sep. 9, 2015.

International Search Report and Written Opinion in PCT/US2015/037494 dated Sep. 14, 2015.

International Search Report and Written Opinion in PCT/US2015/037465 dated Oct. 27, 2015.

International Search Report and Written Opinion in PCT/US2015/037481 dated Sep. 14, 2015.

"Color Blind Assistant." iPhone Apps Versions 2.61 and 2.62; Release date Oct. 14-15, 2009; pp. 1-7.

"Color Name & Hue." Wayback Machine Archive; May 16, 2013; pp. 1-17. <http://web.archive.org/web/20130516202647/http://www.color-blindness.com/color-name-hue>.

"HTML Color Picker," Wayback Machine Archive; Feb. 15, 2013; 1 page. <http://web.archive.org/web/20130215181242/http://imagecolorpicker.com/>.

"Tin Eye Labs." Wayback Machine Archive; Sep. 20, 2012; pp. 1-3. <http://web.archive.org/web/20120920051712/http://labs.tineye.com/color/>.

Delon, J., et al., Automatic Color Palette, Proceedings of the International Conference on Image Processing, vol. 2, Sep. 11-14. 2005, pp. 706-709.

Nickerson, D., et al., Central Notations for ISCC-NBS Color Names, Journal of the Optical Society of America, vol. 31; pp. 587-591; Sep. 1941.

Das et al, Indexing Flower Patent Images Using Domain Knowledge, IEEE Intelligent Systems, vol. 14, No. 5; 1999, pp. 24-33.

Balasubramanian, Raja, et al.; Sequential Scalar Quantization of Color Images, Journal of Electronic Imaging, vol. 3, No. 1, pp. 45-59; Jan. 1994.

\* cited by examiner

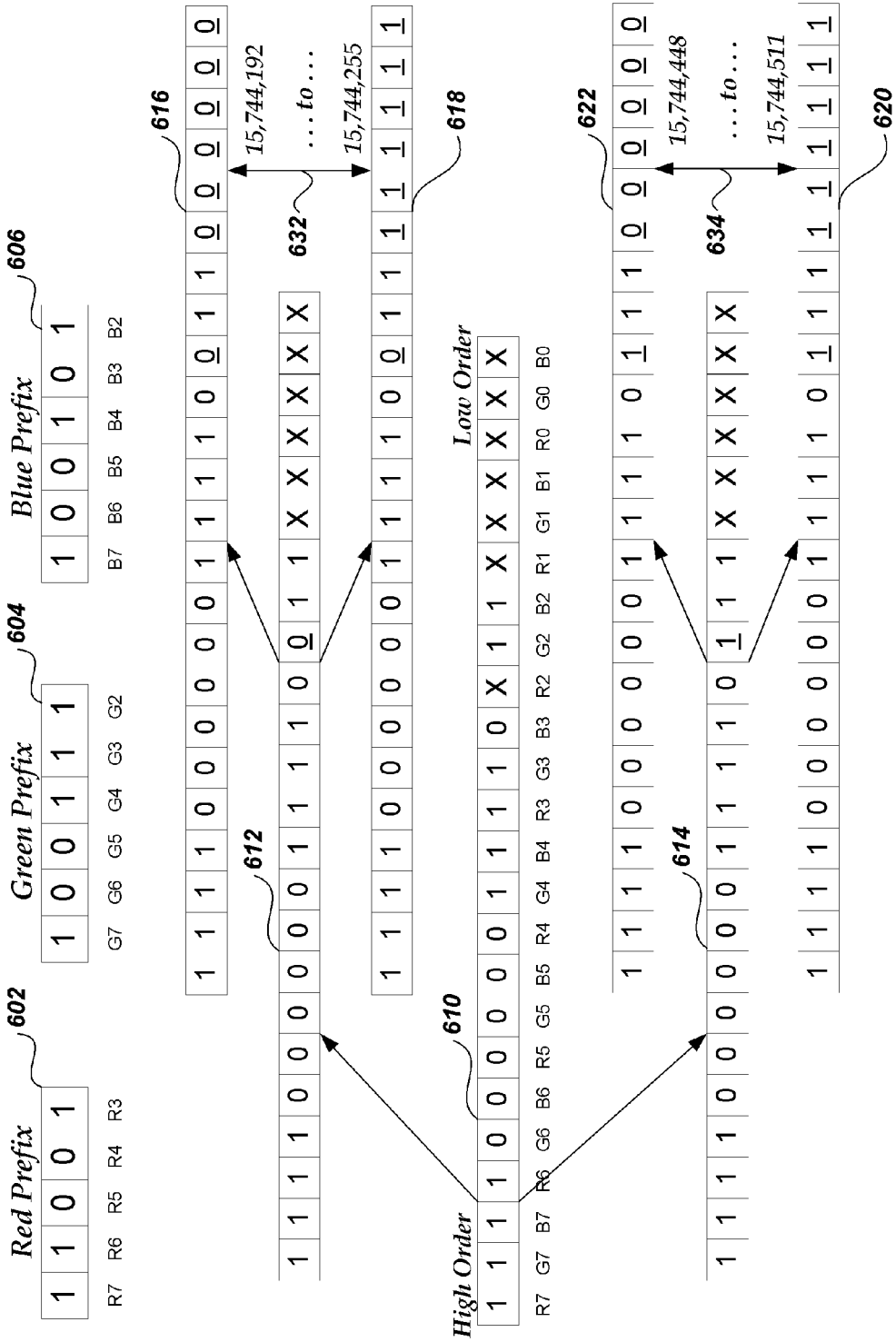

FAST COLOR SEARCHING

BACKGROUND

Generally described, computing devices may search for information based on a color. In one system, a color description may be tagged in association with an image or any object in a database. A user may input a keyword (e.g., "green") and any objects matching the tag/keyword "green" may be returned in a search. A user can then browse the search results to find a particular green.

Users may also specify a color to search through a color picker user interface. For example, a search engine may offer a color image search where, as one criteria of the search, one of twelve displayed colors may be selected with a mouse. The search engine will then return images that contain the selected color, such as internet images or images from any of a number of databases. For example, a purple color may be selected using the search engine's interface. When searched in combination with a keyword, the search engine may return images that are related to that keyword and also contain the selected purple color.

BRIEF DESCRIPTION OF THE DRAWINGS

FIG. 6 is a schematic diagram illustrating an example of interleaved one dimensional color ranges computed from a permutation of range prefixes.

DETAILED DESCRIPTION

Figure 1:
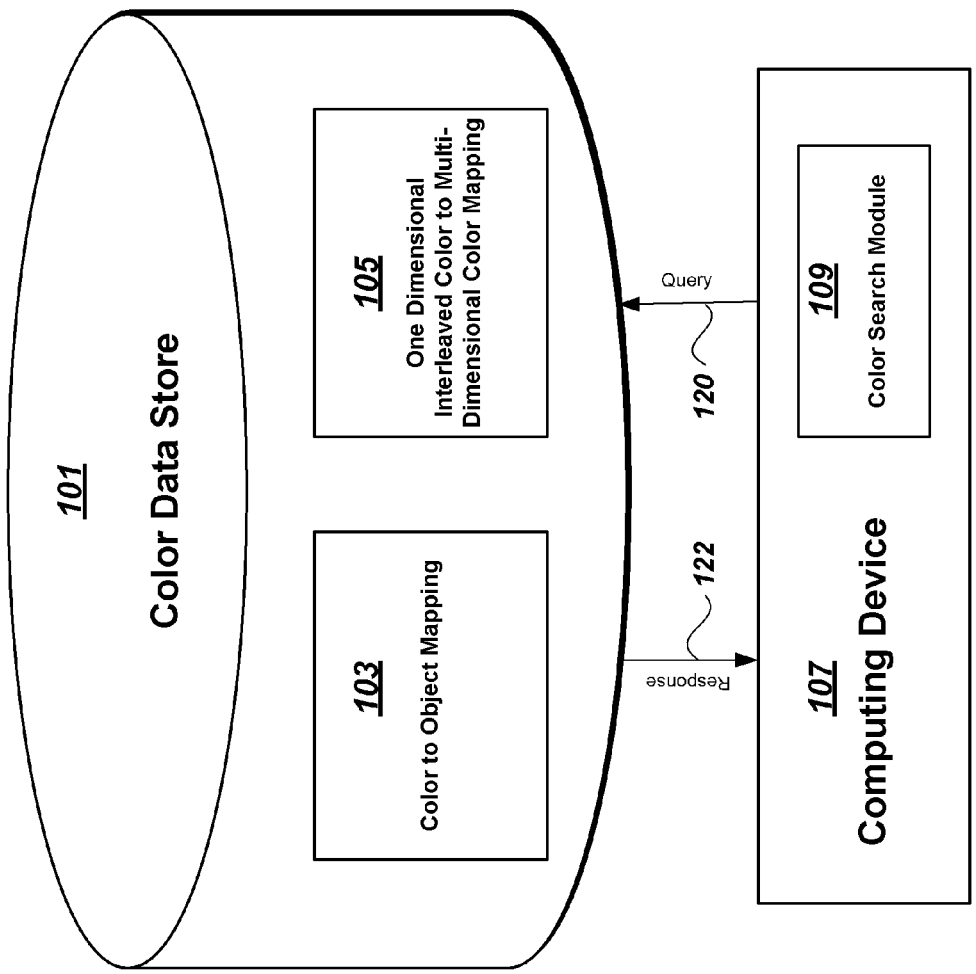
FIG. 1 is a block diagram depicting an illustrative network topology of a fast color searching system.

Generally described, aspects of the present disclosure relate to creating a fast color search data store and/or performing a fast color search by one or more computing devices. Searching by color (e.g., a specific RGB color or a RGB color range) in a structured data store can be challenging due to the multidimensional nature of colors. Such a data store may include 3-dimensional RGB colors that are associated with objects in a relational database or some other type of data store. For example, the RGB color value (e.g., #c108e5) may be stored in the data store in association with a green dress, a green image, or any other data object with a green association.

The RGB color values in such a data store may be indexed for searching. A data store index may be a data structure that improves the speed of data retrieval operations on a data store table at the cost of additional writes and the use of more storage space to maintain the extra copy of data. Indexes are used to quickly locate data without having to search every row in a data store table every time a data store table is accessed. Indexes can be created using one or more columns of a data store table, providing the basis for both rapid random lookups and efficient access of ordered records. Such an index on a traditional integer field may allow for quick lookups within an integer range. For example, on an indexed integer field, a search of "between 2000 and 3000" may quickly return all records with integer fields between 2000 and 3000, and can be orders of magnitude faster than a comparison of integer values in all rows.

However, an index of an n-dimensional color value, such as an index of an RGB field, does not assist or speed up searching n-dimensional color ranges. In many scenarios, an RGB color value may be associated in a data store with object records in a data store. The RGB field may also be indexed. However, traditional data stores do not inherently index an RGB field correctly. For example, an RGB value (e.g., #c108e5 in hex) includes three dimensions: the red dimension ("c1"), the green dimension ("08"), and the blue dimension ("e5"). The bits in these separate hex values are arranged by dimension, but are not arranged in highest order to lowest order across all dimensions, which makes range comparisons difficult to perform with a single index. For example, the red dimension's bits in RGB come first, which includes both high order red bits through low order red bits. This is followed by green high order bits through low order bits, which is again followed by blue high order bits down to low order bits. Thus, if a color search range was specified as (#c001e0 through #cf10f0), a single traditional index cannot be used to quickly determine which of the records have associated colors within the range because such a lookup is dependent on an index data structure where all the bits in a field are ordered from highest to lowest order (e.g., usually an integer value or similar data type).

One way to solve this problem may be to have multiple index fields in a data store corresponding to each of the dimensional colors. For example, there may be one field for red (e.g., which may contain as a part of one record the value "c1"), another for green (e.g., which may contain as a part of one record the value "08"), and yet another for blue (e.g., which may contain as a part of one record the value "e5"). Each of these fields may be indexed individually. Thus, when ranges are searched, each index may be used for comparison to the indexed individual colors (e.g., for the range #c001e0 through #cf10f0, the range "c0" through "cf" may be applied to the red index, the range "01" through "0f" may be applied to the green index, and the range "e0" through "f0" may be applied to the blue index). The data store must then determine whether all three indexes indicated that a record was within the respective ranges.

The downside to the foregoing type of dimensional indexing is that a data store must search three indexes instead of one, and then make a comparison of whether all the criteria have been met for all indexes. This procedure is usually less efficient than using a single index to perform a search.

The embodiments described herein allow for increased query speed and fast searching, and overcome many of the drawbacks described above. More generally, in addition to color spaces, the techniques described herein may allow for fast searching of any multi-dimensional space, such as a traditional 3-dimensional coordinate space. For example, in a 3D video game, objects may be located in a 3-dimensional coordinate space on a map (e.g., an X horizontal dimension, a Y depth dimension, and a Z vertical dimension, where each dimension is orthogonal to the other dimensions). In such a video game, a fast searching technique that collapses a 3-dimensional coordinate search range into interleaved one-dimensional integer search ranges, as described herein, may be used to quickly find video game objects within the 3-dimensional coordinate search range.

In one embodiment in accordance with the present disclosure, an n-dimensional color space can be converted into a 1-dimensional color space. For the sake of brevity, although the embodiments described herein often refer to RGB color, which is a 3-dimensional color space, other dimensional color spaces (e.g., 4 or 5 dimensions, etc.) may use one or more of the same techniques described herein to gain the same advantages described for the RGB 3-dimensional color space. Thus, the same or similar techniques may be applied to the color spaces of XYZ, Hue Saturation Brightness/Luminance (HSB/HSL), Hue Saturation Value (HSV), Hue Saturation Intensity (HIS), Cyan Magenta Yellow Key (CMYK), Lab, Lightness Chroma Hue (LCH), LMS, YCbCr and Y'CbCr as used in image or video, Tint Saturation Lightness (TSL), Red Green (RG), YIQ (as used by NTSC color TV system), and YUV (as used by the PAL color TV system). As would be recognized by one skilled in the art, in color spaces that do not use an integer format for a color dimension, the techniques described herein may still be applied by converting a floating point dimension value to an integer dimension value.

Each of the colors in the RGB color space, namely red, green, and blue, can be represented by a single byte of data (8 bits). By interleaving the three colors of bits (e.g., where each character represents one bit: RGBRGBRGBRGBRGBRGBRGBRGB as will be further described in reference to FIG. 3), one can form a 24 bit integer that is uniquely representative of each color yet has only a single dimension. One advantage of interleaving the RGB bits is that the order of importance of the bits is preserved. Generally, colors which are close in terms of human perception are also close together on this integer range (e.g., they tend to have the same higher order bits).

One advantage of preserving the order of the bits is that such ordering effectively represents the 3-dimensional color values distance from black (i.e., #000000) and white ((i.e., #FFFFFF). Higher order bits generally indicate a larger distance from black (i.e., closer to white), whereas less high order bits and more low order bits generally indicate a greater distance from white (i.e., closer to black). Thus, in effect, the interleaved values may be considered grayscale values.

For each color in a data store, a column may be added to hold its equivalent 24 bit interleaved integer. A standard data store integer index may be added to a table with this column. Such an index on an interleaved color value may be considered a grayscale index value. When a search is performed based on an RGB color range, preprocessing may occur that converts the color range to a plurality of interleaved color ranges. The preprocessing may determine one or more binary splits in each individual color byte. For example, if the red color range runs between "00001110" and "00010001," then the preprocessing may convert the red color search into two ranges ("00001110" to "00001111") and ("00010000" to "00010001") that can be permuted (and interleaved) with the determined ranges from the other colors green and blue.

Turning now to FIG. 1, a block diagram is shown that illustrates a color data store 101 that is searchable by a computing device 107. Color data store 101 may be any type of data store that allows for integer indexing, including a relational database such as an SQL database, or a hierarchical data store. Color data store 101, while stored on one or more non-transitory, computer readable media, may include one or more logical data stores, each logical data store including one or more data store tables. Color data store 101 may be implemented in a single computing device capable of executing software instructions to provide data store services, and/or many computing devices capable of together providing data store services (e.g., allowing for mirroring, backups, etc.). In yet other embodiments, color data store 101 may be implemented as a web service or by one or more virtual machines in a hosted computing environment. The hosted computing environment may include one or more provisioned and released computing resources, which computing resources may include computing, networking and/or storage devices.

Color data store 101 may include one or more tables with color columns. For example, table 103 may include a plurality of records, each record including data for an object (or a reference to an object such as an object identifier) and associated with an RGB color. For example, each object reference in table 103 may identify an item that one can buy on a network site (a jacket, a book, a stapler, a service, etc.). The item's data may be in table 103 or in a separate table or data store accessible via the item's identifier. Each item may be associated with one or more RGB colors in the table (e.g., a color mapping). The colors associated with the object may be derived by analysis of a picture of the object. Various methods and systems for extracting colors from an image are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In some embodiments, table 103 may contain one or more mappings of an object to a color. Multiple rows in the data store may indicate that an object, such as an image object, is mapped to RGB coded colors for pinkish/purple, Easter blue and forest green for instance. Thus, a query of table 103 on a specific color may reveal one or more objects/items mapped to that color in the data store.

In the same table, or a separate table, such as table 105, the RGB colors may be mapped to a one dimensional integer value. The one dimensional integer value may include interleaved bits of the RGB coded colors. For example, if the color coding for Easter blue is #44EDE5, then the interleaved 24 bit integer may look like 011111011000010111000011 (as represented in bits). Interleaving is further described with reference to FIG. 3 described herein. In some embodiments, tables 103 and 105 may be the same, where objects may be mapped directly to the flattened one dimensional 24 bit integer representation of a color.

The data store table(s) may be queried using the 24 bit integer to determine one or more objects associated with a color. In some embodiments, the data store 101 may receive an SQL query to determine if one or more objects have an associated color within the color range. For example, an SQL "where" clause statement may be a parameter that is used to search on a color range (e.g., "where 24intcolor between '239874' and '736583'"), where values in column "24intcolor" are the interleaved 24 bit colors. Using a mapping of the 24 bit color to the RGB color (or, in some embodiments, simply mapping straight to an object) allows the data store to identify and return those objects that are associated with the range of colors searched.

Color data store 101 may be connected to many devices, directly or indirectly, on a network (e.g., a private network, the Internet, etc.) that allows the data store to receive queries and transmit search results. The data store may be one device (e.g., a data store server), multiple devices, or in remote computing devices such as remotely hosted on the Internet/cloud.

Computing device 107 may be able to issue a query 120 and access the data store 101 via networking such as IP networking (Internet, intranet, combination of both, etc.). Computing device 107 may be a server (or a server farm or hosted computing device(s)) that has received a client color inquiry, processed the inquiry via a color search module 109, and generated one or more interleaved color ranges as described herein. The query 120 may then be sent to the data store 101 for resolution. The data store 101, after receiving the query 120 (e.g., an SQL query), may process the query 120 and return a response 122 including search results after comparing the interleaved color ranges to the interleaved color ranged index (e.g., included in table 105). Such a comparison may result in one or more matching colors or objects (e.g., items or images) that may be returned in a response 122. The computing device 107 may then use the returned colors and/or objects for any purpose (e.g., returning an item to a client device, showing matching colors to a user that falls within the specified range, etc.).

In some embodiments, color data store 101 may be connected to computing device 107 directly rather than through a traditional communication network. For example, the computing device 107 may store color data store 101 and execute a data store process to answer queries, as well as execute network server (or other server) processes to accept user color queries through the Internet, or through a local user interface. The color search module 109 may then process the color queries, send interleaved color ranges to the data store processes, and receive a response.

In some embodiments, the computing device 107 may include a user device (e.g., a home or office computer, smartphone, tablet, a wearable computing device, etc.) that includes an arrangement of computer hardware and software components such as a processing unit, a network interface, a non-transitory computer-readable medium drive, and an input/output device interface, all of which may communicate with one another by way of a communication bus. The network interface may provide for connectivity to one or more networks or computing systems. The processing unit may thus receive information and instructions from other computing devices, systems, or services via a network. The processing unit may also communicate to and from memory and further provide output information via the input/output device interface. The input/output device interface may also accept input from various input devices, such as a keyboard, mouse, digital pen, touch screen, etc. The memory of the computing device 107 may contain computer program instructions, such as the color search module 109, that the processing unit may execute in order to implement one or more embodiments of the present disclosure. The memory generally includes RAM, ROM and/or other persistent or non-transitory computer-readable storage media.

In addition, the memory may include a user browser. The user browser may have contacted a network site, e.g., a website, and loaded a graphic user interface based on information received from a remote server. The user browser may be used to initiate a search. For example, the user browser may obtain a color range to search, and in some embodiments additional search parameters, such as keywords, item price, type of item/object, etc. Such additional parameters may be used to further filter the search results in addition to color. The color search module 109 may execute on the computing device 107, either within the browser (e.g., via a JAVASCRIPT® module) or outside the browser to preprocess the range and generate one or more interleave ranges to search via the color search query 120. At this point, the query 120 may be sent to the color data store 101, processed via comparison of the 24 bit integer color index to the 24 bit interleaved search ranges, and a response 122 generated and sent back to the computing device 107. The response 122 may be further filtered based on additional query parameters described above. Once the response 122 is returned, the browser or other process may generate a graphical user interface to display and/or interact with one or more of the search results.

Search performance for color data store 101 may be improved by implementing color data store 101 across multiple sub-data store systems. In such a scenario, each sub-data store that makes up color data store 101 may be responsible for answering queries for specific, predefined color ranges. By way of example, in a simple scenario, color data store 101 could be implemented by using three sub-data stores. Each sub-data store may be configured to receive queries for specific interleaved color ranges, such as sub-data store #1 responding to queries where the flat one dimensional color starts with a "0" highest order bit, sub-data store #2 responding to queries where the flat one dimensional color starts with a "10", and sub-data store #3 responding to queries where the flat one dimensional color starts with "11."

The ranges assigned to each sub-data store may be configured manually, or automatically, based on the density of index color values within each sub-data store. In one embodiment, an algorithm may configure a sub-data store to handle a larger, sparsely-populated color range, and configure another sub-data store to handle a smaller, but more densely-populated, color range. Such an algorithm may be executed without human intervention so as to adjust each sub-data store on the fly based on the population of possible results within specific color ranges. This approach may spread out the records in color data store 101 across the sub-data stores according to the processing power of each sub-data store.

In a multiple sub-data store scenario, a computer creating a search query may then craft separate queries for each sub-data store system, send them out in parallel to each sub-data store system, and receive results in parallel. This parallelism may create a performance increase by querying multiple, smaller sub-data stores at the same time.

The color data store 101, and in particular, a table (such as table 105) that includes a one dimensional interleaved color mapping (e.g., a 24 bit interleaved integer) to a multi-dimensional color mapping (e.g., RGB color or an item with an affiliated color) may be generated to support fast color queries as described below in FIG. 2.

Figure 2:
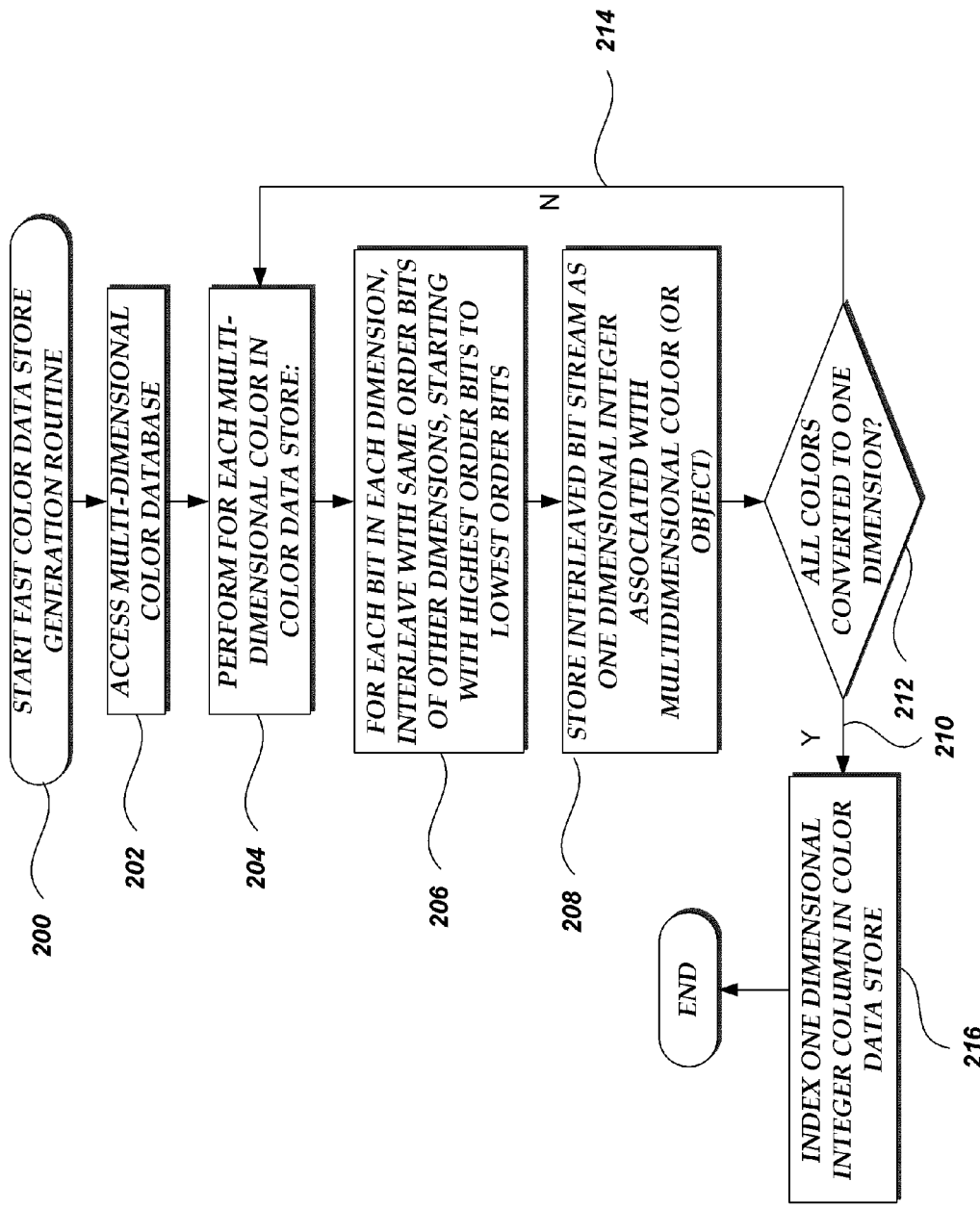
FIG. 2 is a flow diagram illustrating an example of a process for generating or configuring a fast color search data store included in FIG. 1.

With reference now to FIG. 2, an embodiment of a fast color data store generation routine 200 is implemented by an accessing computing device, such as the computing device 107, will be described. One skilled in the relevant art will appreciate that actions/elements outlined for routine 200 may be implemented by one or many computing devices/components/modules that are associated with the computing device 107, such as the color search module 109, or associated with the color data store 101. Accordingly, by way of example, routine 400 has been logically associated as being performed by the computing device 107.

At block 202, a computing device 107 may access the color data store 101 (e.g., login to the data store or otherwise prepare to perform queries and store data in the data store). The accessing computing device may be computing device 107, or any other computing device capable of interacting with the color data store 101, including any computer device that implements the color data store 101.

Figure 3:
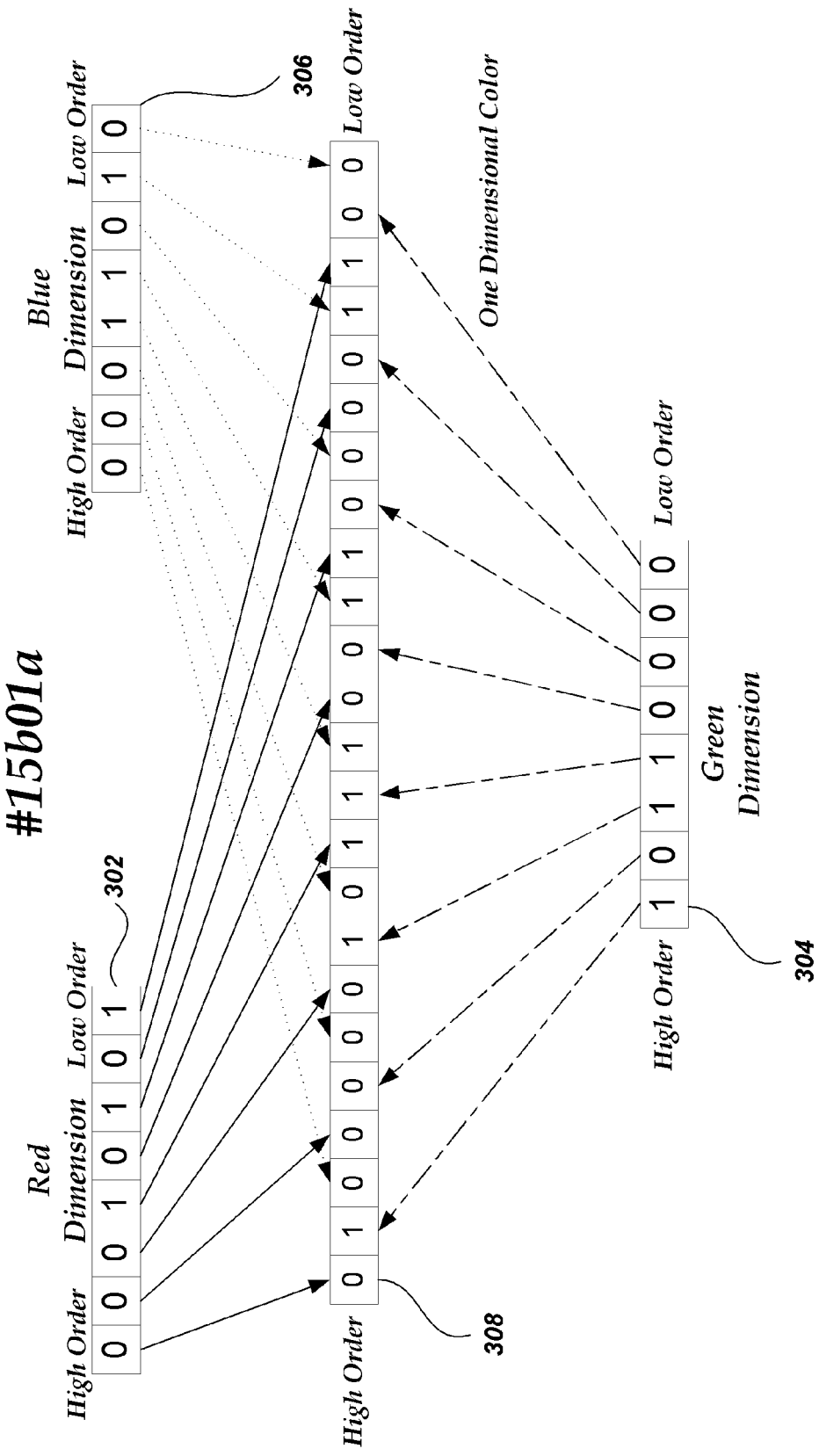
FIG. 3 is a schematic diagram illustrating an example of interleaving bits to transform a multi-dimensional color model to a one dimensional representation of a color.

At block 204, the computing device 107 may query and access each color used or available in the color data store 101. Then, at block 206, for every color in the multi-dimensional color data store 101, the computing device may interleave the bits from each dimension of the multiple dimensions in the color data store 101. For example, as illustrated in FIG. 3, which is further discussed below, the red dimension bits, the green dimension bits, and the blue dimension bits in an RGB color value may be interleaved to form a 24 bit integer. FIG. 3 discloses one example of how interleaving may be performed throughout this application.

In FIG. 3, the RGB color #15b01a may correspond to what is commonly known as "green." This green color, being a part of the RGB three dimensional color space, has three dimensions (red, green, and blue) that may respectively be represented in decimal (21, 176, 26), hex (15, b0, 1a) or bits (00010101, 10110000, 00011010). The bits of the red dimension 302 may be ordered from highest to lowest, from left to right (e.g., big endian, smaller memory address to higher memory address). For example, the magnitude of a red light (e.g., LED "brightness") to display in combination with the other colors may be scaled according to the value of the red dimension. Each bit is valued according to its normally 8 bit/1 byte integer weight. Thus, a "1" in the highest order bit is valued at 128 (2 to the 7th power ($2^7$)), whereas a 1 in the lowest order bit is valued as a 1 ($2^0$). For the example red dimension value 302, the values are 00010101, which are values for the bits called R7, R6, R5, R4, R3, R2, R1, and R0, respectively.

Similarly, the magnitude of the green light to display in combination with the red and blue lights may be scaled according to the bits in green dimension 304. For the example green dimension value 304, the values are 10110000, which are values for the bits called G7, G6, G5, G4, G3, G2, G1, and G0 respectively. Likewise, the blue dimension values 00011010 are values for the bits B7, B6, B5, B4, B3, B2, B1, and B0 respectively.

A 24 bit integer value may then be formed that interleaves all of the bits of the red, green, and blue dimension values such that their order within a dimension is preserved. For example, 24 bit integer 308 may now include, after being interleaved, 010000010111001100001100. This value corresponds to interleaving the bits in the following order: R7 G7 B7 R6 G6 B6 R5 G5 B5 R4 G4 B4 R3 G3 B3 R2 G2 B2 R1 G1 B1 R0 G0 B0. Other possible examples may include altering the order of the RGB bits (e.g., green first G7 B7 R7 G6 B6 R6 . . . etc.), reversing the order of the bits which may, for example, be used for little ending systems (R0 G0 B0 R1 G1 B1 R2 G2 B2 R3 G3 B3 R4 G4 B4 R5 G5 B5 R6 G6 B6 R7 G7 B7, or even B0 G0 R0 B1 G1 R1 B2 G2 R2 B3 G3 R3 B4 G4 R4 B5 G5 R5 B6 G6 R6 B7 G7 R7). One skilled in the art would understand how to implement a multi-dimensional color interleaving system using little endian ordering by using a reverse bit order. Additional alternative interleaved bit orderings may also be used that allow for 24 bit integer color range searching.

Returning to FIG. 2, at block 208, for every RGB color converted to a 24 bit integer, the 24 bit one dimensional integer may then be stored in the color data store 101 in association with the associated multidimensional color (such as in table 105 in association with an RGB color), which may be indirectly or directly associated with an object in the color data store such as an item (e.g., an item identifier). In some embodiments, the 24 bit integer may be stored in direct association with an object in the color data store 101 (e.g., a mapping to an item identifier in a single table).

At block 212, the fast color data store generation process may determine whether all colors have been converted to a single 24 bit color 212. If not, arrow 214 indicates that the process may repeat and more colors can be converted and stored in the color data store 101. Otherwise, as indicated by arrow 212, the process of converting all the colors may end.

At block 216, the color data store 101 may then index a column in a table storing the generated one-dimensional interleaved integer representing a color to enable fast range searching based on the one-dimensional integer. After indexing, the fast color data store generation process may end at block 218. The color data store 101 is now able to perform a fast color search when a query is received.

Figure 4:
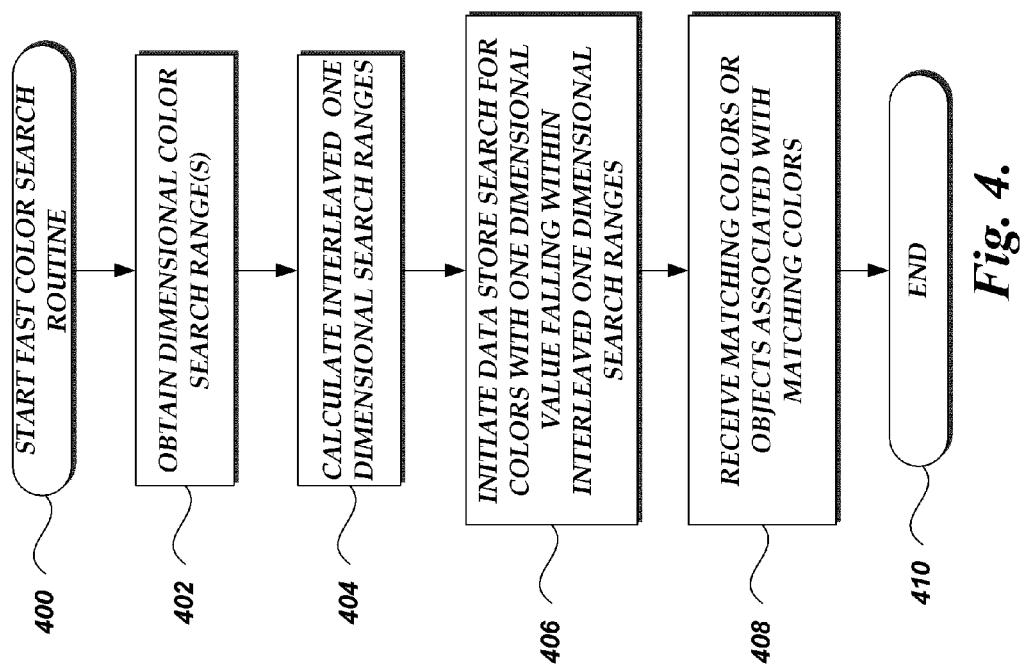
FIG. 4 is a flow diagram illustrating an example of a process for fast color searching.

FIG. 4 illustrates one embodiment of a routine executing on one or more computing devices, such as computing device 107, for searching a fast color search data store such as color data store 101. Such a routine may be performed by software instructions executed by a hardware processor and may include one or more components of the color search module 109. The software instructions may be stored for execution in a non-transitory storage medium, such as one or more registers, memories, magnetic disks, flash memories, solid state drives, etc.

With further reference to FIG. 4, an embodiment of a fast color search routine 400 implemented by an accessing computing device, such as the computing device 107, will be described. One skilled in the relevant art will appreciate that actions/elements outlined for routine 400 may be implemented by one or many computing devices/components/modules that are associated with the computing device 107, such as the color search module 109. Accordingly, routine 400 has been logically associated as being performed by the computing device 107.

At block 402, the computing device 107 obtains an input for a color range to search. In some embodiments, this input may include input from a man/machine interface, such as through a keyboard, mouse, etc., as input into a graphical user interface, such as a browser. For example, a user may browse a network site and input one or more RGB colors or color ranges to be searched. Such a color (e.g., an RGB value) may be selected via a color picker interface, a curated color palette, a color palette pulled from an image, an item that has one or more colors associated with it (e.g., to find other items with similar colors), a color determined from a keyword to color translation, or other method. In some embodiments, a color range to search may be obtained via the network, such as via a server receiving one or more packets from a client device containing color ranges to search. Various methods and systems used to obtain one or more colors or color ranges are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety.

If a color range is not obtained, but instead a single color is obtained, one or more color ranges to be searched may be determined based on one or more selected colors. In some embodiments, a color range may be determined based on a configurable color range that can be applied to a color. For example, if green color "#15b01a" is obtained, a color range may be determined by adding and subtracting from one or more color dimensions, a set value (for example, 4 color magnitude). Such an example would create a range of between (in hex) "11" to "19" in the red dimension, "ac" to "b4" in the green dimension, and "16" to "1e" in the blue dimension.

In another embodiment, the color range(s) may be determined by applying a human recognizable color distance/difference formula. Such a formula may generate one or more dimensional color ranges for a given RGB value that may be imperceptible to human detection based on a given starting color, and may be considered the same color as the starting color for human purposes. In an embodiment, the color search range may include those colors not detectable as different by a human, and/or may include those search ranges barely detectable as different by a human. Various methods and systems for determining a human perceptible color difference using a human color distance formula are described in U.S. patent application Ser. No. 14/316,483, entitled "IMAGE-BASED COLOR PALETTE GENERATION," filed Jun. 26, 2014; U.S. patent application Ser. No. 14/316,530, entitled "IMAGE-BASED COLOR PALETTE GENERATION," filed Jun. 26, 2014; U.S. patent application Ser. No. 14/316,528, entitled "IMAGE-BASED COLOR PALETTE GENERATION," filed Jun. 26, 2014; and U.S. patent application Ser. No. 14/316,549, entitled "IMAGE-BASED COLOR PALETTE GENERATION," filed Jun. 26, 2014, each of which is incorporated by reference herein in its entirety.

In yet another embodiment, the color range(s) may be determined based on the output of a previous item search through the use of a color adjustment user interface that allows for modification of a previously searched color. Unlike a color picker user interface that allows for the selection of a color, a color adjustment user interface may include a GUI slider that allows for searching, based on a given color or color range or a wider or narrower range of color; or allows the searched color or color range to be shifted to become more intense, darker, brighter, etc. The previous item search may be the result of a previous color search queried by color alone or in combination with other criteria (such as keywords, price, etc.). In such a scenario, a user interface may display all of the items such that the resulting items can be browsed and examined, and have the color adjustment user interface integrated therein. The user interface may be a network page that allows for scrolling through a plurality of search results. The network page may include a slider that allows for selection of tighter or broader color ranges.

For example, a user on computer device 107 may have selected the color green "#15b01a" from a network-based color picker user interface, and sent an item search to a network server along with the keyword "handbag." The computer device 107 may translate the green color into a color search range within a first threshold around the green color, for the query to include the color search range and the keyword "handbag," and transmitted the search criteria to color data store 101. Once a response was received, the computing device 107 may display all of the items and their associated images within a browser on a network page. The network page may have a slider user interface element that allows for the color search range to be adjusted upwards by sliding the interface in a first direction. Sliding in the first direction may direct computing device 107 to resubmit the search with a wider or broader color search range than in the previous search. The color search range may be widened in a ratio consistent with an amount the slider was moved in the first direction.

Similarly, the previous color search range may be adjusted downward by a user sliding the slider in a second direction, which may cause the color search range to decrease in a ratio consistent with an amount the slider was moved in the second direction.

Once the slider or other adjustment user interface has been altered, the new search may be initiated based on the widened or narrowed color search range criteria. The search results in the response would thus be widened or narrowed in accordance with the new color search range. In this manner, a user can "see more" results matching a given color by widening a color search range, or "see less" results by narrowing the color search range.

In other embodiments, color(s) or color search range(s) may be obtained from other sources, including preexisting color palettes, opposite colors, opposite color palettes, color to keyword mappings, etc. Various methods and system for obtaining color(s) and color search range(s) are described in U.S. patent application Ser. No. 14/316,292, entitled "BUILDING A PALETTE OF COLORS BASED ON HUMAN COLOR PREFERENCES," filed Jun. 26, 2014; U.S. patent application Ser. No. 14/316,442, entitled "BUILDING A PALETTE OF COLORS FROM A PLURALITY OF COLORS BASED ON HUMAN COLOR PREFERENCES," filed Jun. 26, 2014; U.S. patent application Ser. No. 14/315,913, entitled "DETERMINING AFFILIATED COLORS FROM KEYWORD SEARCHES OF COLOR PALETTES," filed Jun. 26, 2014; U.S. patent application Ser. No. 14/316,467, entitled "AUTOMATIC COLOR PALETTE BASED RECOMMENDATIONS FOR AFFILIATED COLORS," filed Jun. 26, 2014; U.S. patent application Ser. No. 14/316,268, entitled "AUTOMATIC IMAGE-BASED RECOMMENDATIONS USING A COLOR PALETTE," filed Jun. 26, 2014; and U.S. patent application Ser. No. 14/316,490, entitled "CREATION OF DATABASE OF SEARCHABLE COLOR NAMES," filed Jun. 26, 2014, each of which is incorporated by reference herein in its entirety. Other parameters may also be specified as a part of a color search query to further filter desired results of the query. Such parameters may include keywords, item price, type of item/object, etc.

At block 404, preprocessing may occur to form a fast color search query. For example, at block 404, a process may generate, based on the obtained RGB color search ranges, one or more 24 bit integer search ranges to include in one or more color search queries. Further, at block 404, one or more color search queries may be properly formulated. For example, once the 24 bit integer color search ranges have been generated, those ranges may be formed into one or more formatted SQL queries, API queries, web service queries, etc. Preprocessing is further described below with reference to FIG. 5.

At block 406, computing device 107 may initiate a search query. Initiating a search query may include transmitting a search query including the color range(s) to be searched over a network (e.g., local area network, Internet, VPN, etc.) by computing device 107 to color data store 101 or other color query enabled service such as a web service or color search server. In some embodiments, no transmission may be needed, as the color search module 109 may have direct or local access to a color data store 101, or may be able to execute the query itself via direct access to data store files (e.g., using SQLite).

At block 408, once all 24 bit integer search ranges has been searched, the desired data store records that match or otherwise correlate to one or more of the searched ranges are received by the querying computing device, e.g., through a local process, or transmitted back to the computing device 107 through the network and received by the computing device 107. Such a search result may return one or more matching RGB colors, RGB color palettes, or even 24 bit integers that may be de-interleaved to determine an RGB color. In some embodiments, the search result may return objects (such as items) associated with the one or more 24 bit integer color search ranges that were requested in the query.

The search results may be compiled by the color data store 101 or color search module 109 by comparing the specified integer color search ranges in the query to the index of the 24 bit column. For example, an index may be a tree data structure where, by making integer comparisons to nodes in the tree, the tree may indicate one or more rows that match an integer search range. One advantage is that this is more efficient than a comparison of each row in the data store to the color range, or a comparison of each dimension's search range to three different indexes in a data store.

At block 410, the color search routine may end, and the computing device 107 may use the search results for further processing, or format and display the search results in a user application such as a browser.

Figure 5:
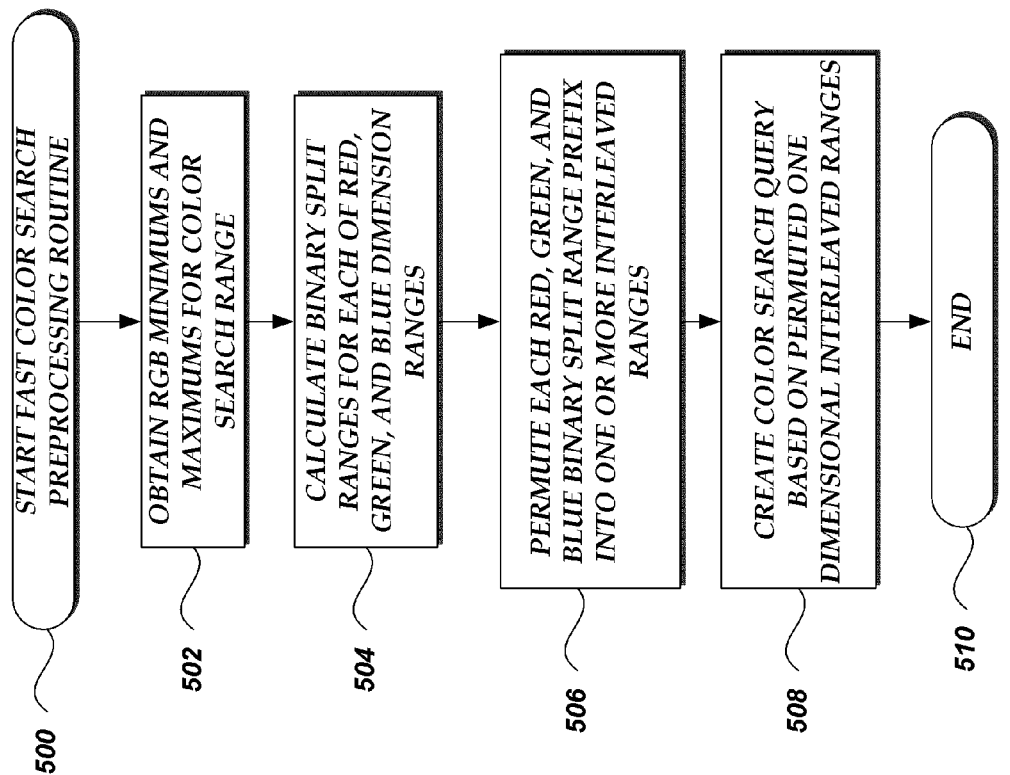
FIG. 5 is a flow diagram illustrating an example of a process for fast color search preprocessing.

With reference now to FIG. 5, an embodiment of a fast color search preprocessing routine 500 implemented by an accessing computing device, such as the computing device 107, will be described. One skilled in the relevant art will appreciate that actions/elements outlined for routine 500 may be implemented by one or many computing devices/components/modules that are associated with the computing device 107, such as the color search module 109, or alternatively by color data store 101 (e.g., when RGB color range(s) are specified in a transmitted search query by a user computing device, and a server or data store must translate the received RGB color range(s) into 24 bit integer color search ranges prior to searching). Accordingly, routine 500 has been logically associated as being performed by the computing device 107.

FIG. 5 illustrates one embodiment's preprocessing of an RGB color search range that may be performed by the color search module 109. One skilled in the art will see that the preprocessing may be quickly extrapolated to any other multi-dimensional color arrangement other than RGB. For example, the computing device 107 may have a color search module 109 including JAVASCRIPT® instructions that may run in a browser. The JAVASCRIPT® instructions may preprocess one or more color search ranges prior to forwarding the ranges to a network server or data store server for searching. One of the advantages of using JAVASCRIPT® is that the processing load of an organization's data stores and servers may be reduced by having user operated computers perform preprocessing for a color search query instead. In addition to JAVASCRIPT®, one skilled in the art will recognize that other programming languages may also be used to implement the fast color searching techniques described herein, whether the resulting code is executed on the user computer side, the server(s) side, or in some combination thereof.

At block 502, the computing device 107 that is performing the preprocessing may obtain RGB color range values. The color range values may include a red maximum color value, a red minimum color value, a green minimum color value, a green maximum color value, a blue maximum color value, and a blue minimum color value. Embodiments may then translate these dimensional color ranges into one or more one dimensional 24 bit integer color search ranges that may be used in a fast color search query. An example process is described below with respect to blocks 504, 506, and 508.

At block 504, each dimensional color's range (e.g., minimum to maximum) may be further split, by the computing device 107, into additional ranges across bit boundaries so that interleaved values may appropriately be searched in one dimension. These may be called binary split ranges or prefixes.

As an illustration of the problem to be solved is as follows. Assume the color search ranges of:
Red minimum: Hex-7e Binary-01111110
Red maximum: Hex-81 Binary-10000001
Green minimum: Hex-00 Binary-00000000
Green maximum: Hex-01 Binary-00000001
Blue minimum: Hex-fe Binary-11111110
Blue maximum: Hex-ff Binary-11111111

When interleaved, the result might appear to create the search range of, in binary: 001101101101101101101000 (interleaving all the minimum values) through 101001001001001001001111 (interleaving all the maximum values), which corresponds to the decimal integer range of 3,595,112 through 10,785,359. However, matching integer based colors within that range may not actually be within the color range to be searched. For example, 4,194,304, which may correspond to the interleaved bit value 010000000000000000000000 and corresponds to the RGB color in hex of #008000 (i.e., a green value of #80), is not actually within the range to be searched (#7f00fe through #8101ff-green does not vary more than between 00 and 01), but does satisfy the criteria of being between 3,595,112 and 10,785,359. This error situation may occur because of bit carryovers from the interleaved values of the various colors. In other words, the carryovers in ranges in 24 bit integer interleaved form affect other dimensions' color values, which is an unintended consequence and makes some colors match a color search range in integer format when a color does not actually match the original color search range.

Such a situation may be avoided via preprocessing before a search query is executed. For example, the preprocessing for the above range will split integer search ranges where a carryover will affect a range to be searched. Instead of searching a single integer range from 3,595,112 through 10,785,359, two ranges can be searched instead: 001101101101101101101000 through 001101101101101101101111, and 101001001001001001001000 through 101001001001001001001111, corresponding to the ranges in decimal integer of 3,595,112 to 3,595,119, and 10,785,352 to Ser. No. 10/785,359, respectively. These split search ranges now appropriately capture the entire search range (e.g., the original search range #7f00fe through #8101ff is equivalent to ranges #7f00fe through #7f01ff and #810fe through #8101ff combined).

In some embodiments, postprocessing, rather than preprocessing, may be used to implement a fast-color search. In embodiments where data store records sparsely populate color search ranges, the identification of split integer search ranges may be performed on computing device 107. Under this scenario, using the same example above, color data store 101 may be searched by computing device 107 using the larger range 3,595,112 through 10,785,359. Because records sparsely populate that range in color data store 101, a limited number of query results may be returned. Because only a limited number of search results are expected to be returned, computing device 107 may determine each split search range after issuing its query to the data store (instead of before), and analyze each individual query result to determine whether it falls within any of the determined split search ranges. One of the advantages of this type of embodiment is that it moves processing from color data store 101 (e.g., comparison of each smaller split search range) to computing device 107, thus reducing the overall load on color data store 101. This type of implementation may also be used in combination with a color data store 101 made up of multiple sub-data stores because under that scenario the sparseness of each sub-data store can be controlled to make post-processing an optimal strategy.

Thus, at block 504, binary split ranges may be determined for each RGB color dimension by determining high order bit prefixes that can be filled out with the remaining bits as 0s or 1s to determine a split search range. Binary split ranges can be determined by calculating one or more range prefixes for the minimum and maximum values of a color dimension, and combining these range prefixes into a list of range prefixes for a given dimension.

For example, for the red color search range, one prefix (the base prefix) may be identified by determining the highest order bit of the minimum value that has the value of "1" as a minimum, and then using the minimum as a lower bound with the upper bound being all previous 0s. If the red color search range was from 00001010 (minimum red value) through 00010000 (maximum red value), then aforementioned prefix may correspond to the bit prefix of 0000101 of the minimum value. This prefix may be thought of as a range (e.g., binary split range) which corresponds to a range of 00001010 through 00001011 (i.e., a range based on the prefix where the remaining bits (underlined) are all filled out with 0s for the minimum of the range, and 1s for the maximum of the range). Thus, the prefix value 0000101 may be added to a list of prefixes for the red color.

More prefixes may be identified by computing device 107 based on the minimum value. One criterion for identifying additional prefixes involves examining the base prefix. Starting from the lowest bit, if there are any additional higher order bits in the base prefix that have a 0 (e.g., 0000101), an additional prefix may be identified if the additional prefix includes lower order bits than the highest order bit of the minimum value bit that equals 0, and the maximum bit of that order is a 1. This bit may be referred to as a "divergent" bit, since it is the bit where the maximum value begins to diverge from the minimum value). Such a prefix may then be finally identified by replacing the identified "0" with a "1." More than one additional prefix may exist within the base prefix.

Returning to our example, the minimum value has such a matching zero, 00001010, and the prefix includes 000010, which includes lower order bits than divergent bit (here underlined where the bit strings diverge: min: 00001010 and max: 00010000). The identified prefix contains bits of a lower order than the divergent bit (e.g., the fifth and sixth lowest order bits). Since 000010 has been identified, the actual prefix to add is 000011 (". . . the prefixes may then be included by replacing the identified '0' with a '1'"). Thus, this would identify the additional prefix of "000011" and add it to the list of prefixes for the red color (which already contained 0000101).

Another set of prefixes may be determined by computing device 107 by analyzing the maximum bit value for a color. The computing device 107 may identify the lowest order bit value of the maximum value that is a 0, and taking as a prefix the identified value 0 bit, and all higher order bits. Thus, 00010000 would be added as a prefix to the growing list.

Another set of prefixes that may be added are any prefixes of the maximum value where the maximum value has a bit of "1" after the divergent bit. These prefixes may then be included by replacing the identified "1" with a "0."

In the afore-mentioned example, no additional prefixes would be identified, as the maximum red value is 00010000, and has no bits with a "1" value after the divergent bit. However, if the maximum red value was actually 00010100, then the second "1" would identify a prefix, 000101, the second "1" would then be replaced with a "0" (to form prefix 000100), and the prefix 000100 would be added to the list of red prefixes.

Although the example above determined a list of binary split ranges (e.g., a prefix list) for red values, a list of binary split ranges may be determined for the blue and green dimensions similarly, or any dimension of a color space. Thus, a list of binary split ranges/prefixes may be determined for each color dimension, and specifically for the red, green, and blue dimensions based on the maximum and minimum values in a range to be searched for each dimension.

Returning to FIG. 5, at block 506, the prefixes may be permuted and interleaved by computing device 107. Each such permutation may be converted into one or more 24 bit integer ranges for searching (or other n-dimensional interleaved bit integer range depending on how many bits makeup a dimension, and how many dimensions make up the color model).

For example, using RGB, there may be three prefix lists—one for red, one for green and one for blue. Each prefix in the red list may be permuted with all of the other prefixes for the other colors, so that the computer determines all possible combinations of prefixes that have one prefix from the red list, one prefix from the green list, and one prefix from the blue list. Each permutation can be interleaved and converted into one or more 24 bit integer search ranges.

FIG. 6 illustrates an example of interleaving and conversion of a particular permutation by computing device 107. For this example permutation, a red prefix 602 has been selected (11001), a green prefix 604 has been selected (100111), and a blue prefix 606 has been selected (100101). These bits may then be interleaved based on their bit order, such as described in FIG. 3. However, a number of bits are not present in the prefixes. For example, the red prefix is missing the last three bits, and the blue and green prefixes are missing the last two bits. This creates an interleaved bit structure that would be incomplete. For example, interleaved bits 610 shows an interleaved string with missing bits (Xs) based on these prefixes, and thus showing that the R2 bit is missing, and the R1, G1, B1, R0, G0, and B0 bits are also missing.

There may be two types of missing bits. The first type may be a missing bit that has lower order bits in the 24 bit integer that are defined. This may be called an "interior split bit." For example, the bit labeled R2 in interleaved bits 610 is missing, as indicated by the "X." However, the bits G2 and B2, are defined (e.g., were included in the selected green prefix 604 and blue prefix 606) and are of a lower order in the 24 bit string ("lower order" here, for this 24 bit interleaved integer, means "comes after" or of a lower order when the 24 bit interleaved integer is considered a normal integer).

When a bit of the first type is identified, the permutation of red, green, and blue prefixes may be split into two identical permutations for further range determination, where a first permutation 612 has a "0" for the identified bit, and a second permutation 614 has a "1" for the identified bit (as indicated by the underlined bit values in interleaved 24 bit integers 612 and 614). Further missing bit analysis may then be performed on these two similar permutations of the prefixes with only one bit of difference. The original permutation, here permutation 610, need not be further analyzed. This type of split may be performed again and again until there are no more interior split bits within any of the resulting permutations.

A second type of missing bit may also be identified. This missing bit may be identified by determining that the missing bit does not have any defined bits of a lower order. For reference, this missing bit may be called an "ending range bit." When this type of bit is identified, and usually after all interior split bits have been resolved through a split into two identical permutations with only a one bit difference, then a permutation may be converted to a 24 bit range. This is done by calculating two 24 bit integers: a lower bound of the range which is determined by taking the permutation and setting all remaining ending range bits to "0," and another upper bound of the range which is determined by taking the permutation and setting all remaining ending range bits to "1."

For example, interleaved 24 bit permutations 612 and 614 have remaining ending range bits, corresponding to R1, G1, B1, R0, G0, and B0 (in other words, the last 6 bits of the interleaved 24 bit integer). Because there are no defined bits of lower order than the ending range bits, these bits may now be used to form an integer search range. For permutation 612, the lower bound may be determined by setting the ending range bits to 0 (as shown in permutation 616), which equals the integer 15,744,192. The upper bound may be determined by setting the ending range bits to 1 (as shown in permutation 618), which equals the integer 15,744,255. Thus, one calculated search range 632 may be a query range for an interleaved color value between 15,744,192 and 15,744,255.

For permutation 614, the lower bound may be determined by setting the ending range bits to 0 (as shown in permutation 622), which equals the integer 15,744,448. The upper bound may be determined by setting the ending range bits to 1 (as shown in permutation 620), which equals the integer 15,744,511. Thus, one calculated search range 634 may be a query range for an interleaved color value between 15,744,448 and 15,744,511. All of the identified 24 bit color search ranges, over all of the permutations of prefixes, may be collected and stored to be searched.

Returning to FIG. 5, after determining one or more permuted one dimensional interleaved color search ranges as described above, one or more color search queries may be formed at block 508. One example embodiment may generate an SQL "where" clause to string together multiple 24 bit integer color search ranges in a query (e.g., an SQL "select" statement). For example, a clause such as "SELECT*FROM <table 105> WHERE (interleave_rgb_color BETWEEN 15744448 AND 15744511) OR (interleave_rgb_color BETWEEN 15744192 AND 15744255)," where the query lists all search ranges, may be one such crafted query based on the examples above. However, the query would likely be much longer if there are further permutations of red, green, and blue prefixes that may be combined to form unique search ranges, each of which may produce one or more search ranges depending on the number of interior split bits. All of the resulting ranges may be used to form a query, or multiple queries, for total range coverage of a traditional multi-dimensional color search query. In other embodiments, a properly formatted web service query may incorporate the determined integer color ranges to search by adding the ranges as parameters to a search.

After the search query(ies) are generated, at block 510, the preprocessing routine may end. The search may now be transmitted or executed, as described with reference to FIG. 4 (e.g., block 406).

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. A storage medium can be coupled to the processor such that the processor can read information from, and write information to, the storage medium. In the alternative, the storage medium can be integral to the processor.

The processor and the storage medium can reside in an ASIC. The ASIC can reside in a user terminal. In the alternative, the processor and the storage medium can reside as discrete components in a user terminal. A software module can comprise computer-executable instructions which cause a hardware processor to execute the computer-executable instructions. The computer-executable instructions can comprise a scripted computer language and/or a compiled computer language. Computer-executable instructions can comprise, for example and without limitation, JAVASCRIPT®, PYTHON™, php, SQL, C, C++, JAVA®, C#, Fortran, BASIC, shell scripts, Perl, or the like.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
a memory configured to store computer-executable instructions; and
a computing device comprising one or more hardware processors, the computing device in communication with the memory and configured to execute the computer-executable instructions to at least:
obtain a color search range for colors, the colors specified by an n-dimensional color model, the color search range comprising, for each color dimension in the n-dimensional color model, a minimum dimension color value and a maximum dimension color value;
for each color dimension, identify a first bit prefix that comprises a subset of bits of the minimum color value of the respective color dimension and a second bit prefix that comprises a subset of bits of the maximum dimension color value of the respective color dimension;
interleave bits of each color dimension's first bit prefix based on a bit order of the bits of each color dimension's first bit prefix to form an interleaved first bit prefix;
interleave bits of each color dimension's second bit prefix based on a bit order of the bits of each color dimension's second bit prefix to form an interleaved second bit prefix;
generate one or more integer search ranges based at least in part on the interleaved first bit prefix and the interleaved second bit prefix, wherein the one or more integer search ranges each comprise a number of bits that is larger than a number of bits in the interleaved first bit prefix;
generate a search query, the search query comprising the one or more integer search ranges as search parameters, wherein generation of the search query to comprise the one or more integer search ranges instead of a second integer search range representing the color search range results in an increased query speed, the increased query speed resulting based at least in part on at least one bit value that falls within the second integer search range not falling within the one or more integer search ranges;
initiate a search, based at least in part on the search query, of a data store for colors within the one or more integer search ranges, the data store comprising records associated with at least one indexed integer color value; and
receive search results from the data store, the search results comprising records associated with at least one indexed integer color value within the one or more integer search ranges.

2. The system of claim 1, wherein the n-dimensional color model is an RGB color model.

3. The system of claim 2, wherein the interleaved first bit prefix comprises bits corresponding to a first bit prefix for a red dimension, a first bit prefix for a green dimension, and a first bit prefix for a blue dimension.

4. The system of claim 3, wherein bits of the interleaved first bit prefix are arranged in a repeating pattern of a red bit from the first bit prefix for the red dimension, a green bit from the first bit prefix for the green dimension, and a blue bit from the first bit prefix for the blue dimension, wherein the red bit, the green bit, and the blue bit are from the same order of bits, the repeating pattern arranged from highest order to lowest order bits.

5. The system of claim 1, wherein the first bit prefix of a first color dimension in the n-dimensional color model is identified by determining a divergent bit.

6. The system of claim 1, wherein the records comprise an object record associated with one or more indexed integer color values within the one or more integer search ranges.

7. The system of claim 6, wherein the object record is an item record.

8. The system of claim 7, wherein the computing device is a user computer.

9. The system of claim 1, wherein at least one of the minimum dimension color value or the maximum dimension color value is determined based at least in part on a human color difference perception formula.

10. A computer-implemented method comprising:
under control of a hardware computing device configured with specific computer-executable instructions,
obtaining a color search range for colors, the colors specified by an n-dimensional color model, the color search range comprising, for each color dimension in the n-dimensional color model, a minimum dimension color value and a maximum dimension color value;
calculating one or more integer search ranges, wherein the one or more integer search ranges are determined by interleaving bits of first bit prefixes that comprise a subset of bits of the minimum color values and interleaving bits of second bit prefixes that comprise a subset of bits of the maximum dimension color values, and wherein the one or more integer search ranges each comprise a number of bits that is larger than a number of interleaved first bit prefix bits;
initiating a search of a data store based at least in part on a search query comprising the one or more integer search ranges as search parameters, the data store comprising records associated with at least one indexed integer color value, wherein initiating the search based at least in part on the search query that comprises the one or more integer search ranges instead of a second integer search range representing the color search range results in an increased query speed, the increased query speed resulting based at least in part on at least one bit value that falls within the second integer search range not falling within the one or more integer search ranges; and
receiving search results from the data store, the search results comprising one or more records associated with at least one indexed integer color value within the one or more integer search ranges.

11. The computer-implemented method of claim 10, wherein the n-dimensional color model is an RGB color model.

12. The computer-implemented method of claim 11, wherein interleaving bits comprises interleaving bits of a first bit prefix for a red dimension, a first bit prefix for a green dimension, and a first bit prefix for a blue dimension.

13. The computer-implemented method of claim 12, wherein interleaving bits comprises arranging in a repeating pattern of a red bit from the first bit prefix for the red dimension, a green bit from the first bit prefix for the green dimension, and a blue bit from the first bit prefix for the blue dimension, wherein the red bit, the green bit, and the blue bit are from the same order of bits, the repeating pattern arranged from highest order to lowest order bits.

14. The computer-implemented method of claim 10, wherein a record comprises an item record associated with one or more indexed integer color values within the one or more integer search ranges.

15. The computer-implemented method of claim 10, wherein at least one of the minimum dimension color value or the maximum dimension color value is determined based at least in part on a human color difference perception formula.

16. A non-transitory computer readable storage medium storing computer-executable instructions that when executed by a processor perform operations comprising:
obtaining an RGB color search range, the RGB color search range comprising a minimum red value, a maximum red value, a minimum green value, a maximum green value, a minimum blue value, and a maximum blue value;
identifying a first red bit prefix that comprises a subset of bits of the minimum red value and a second red bit prefix that comprises a subset of bits of the maximum red value;
identifying a first green bit prefix that comprises a subset of bits of the minimum green value and a second green bit prefix that comprises a subset of bits of the maximum green value;
identifying a first blue bit prefix that comprises a subset of bits of the minimum blue value and a second blue bit prefix that comprises a subset of bits of the maximum blue value;
interleaving bits of the first red bit prefix, the first green bit prefix, and the first blue bit prefix from highest dimensional order to lowest dimensional order to form an interleaved first bit prefix;
interleaving bits of the second red bit prefix, the second green bit prefix, and the second blue bit prefix from highest dimensional order to lowest dimensional order to form an interleaved second bit prefix;
generating one or more integer search ranges based at least in part on the interleaved first bit prefix and the interleaved second bit prefix, wherein the one or more integer search ranges each comprise a number of bits that is larger than a number of bits in the interleaved first bit prefix; and
retrieving search results from a data store using the one or more integer search ranges, the search results comprising records associated with at least one indexed integer color value within the one or more integer search ranges, wherein retrieving the search results using the one or more integer search ranges instead of a second integer search range representing the RGB color search range results in an increased query speed, the increased query speed resulting based at least in part on at least one bit value that falls within the second integer search range not falling within the one or more integer search ranges.

17. The non-transitory computer readable storage medium of claim 16,
wherein the first red bit prefix is identified by determining a first divergent bit in the minimum red value;
wherein the first green bit prefix is identified by determining a second divergent bit in the minimum green value; and
wherein the first blue bit prefix is identified by determining a third divergent bit in the minimum blue value.

18. The non-transitory computer readable storage medium of claim 16, wherein the search results comprise an object record associated with one or more indexed integer color values within the one or more integer search ranges.

19. The non-transitory computer readable storage medium of claim 17, wherein the object record is an item record.

20. The non-transitory computer readable storage medium of claim 18, wherein the computer readable storage medium is accessible to a user computing device.

21. The non-transitory computer readable storage medium of claim 16, wherein at least one of the minimum red value, the maximum red value, the minimum green value, the maximum green value, the minimum blue value, or the maximum blue value are determined based at least in part on a human color difference perception formula.

\* \* \* \* \*